(12) United States Patent
He

(10) Patent No.: US 11,908,490 B2
(45) Date of Patent: Feb. 20, 2024

(54) VIDEO RECORDING METHOD AND DEVICE, ELECTRONIC DEVICE AND STORAGE MEDIUM

(71) Applicant: Beijing Bytedance Network Technology Co., Ltd., Beijing (CN)

(72) Inventor: Siyu He, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/356,556

(22) Filed: Jul. 21, 2023

(65) Prior Publication Data

US 2023/0368816 A1    Nov. 16, 2023

Related U.S. Application Data

(63) Continuation of application No. PCT/CN2022/072403, filed on Jan. 17, 2022.

(30) Foreign Application Priority Data

Jan. 21, 2021  (CN) .......................... 202110080508.7

(51) Int. Cl.
*G11B 27/00*    (2006.01)
*G11B 27/34*    (2006.01)

(52) U.S. Cl.
CPC ............ *G11B 27/005* (2013.01); *G11B 27/34* (2013.01)

(58) Field of Classification Search
CPC .............................. G11B 27/005; G11B 27/34
See application file for complete search history.

(56) References Cited

U.S. PATENT DOCUMENTS 9,451,328 B1    9/2016  Grove et al.
2005/0097614 A1    5/2005  Pedlow et al.
(Continued)

FOREIGN PATENT DOCUMENTS

CN    105554361 A    5/2016
CN    106657814 A    5/2017
(Continued)

OTHER PUBLICATIONS

China National Intellectual Property Administration, Office Action and Search Report Issued in Application No. 202110080508.7, dated Nov. 25, 2022, 7 pages. Submitted with partial English translation.
(Continued)

*Primary Examiner* — Girumsew Wendmagegn
(74) *Attorney, Agent, or Firm* — Alleman Hall & Tuttle LLP

(57) ABSTRACT

A video recording method and device, an electronic device and a storage medium are provided. The method includes: acquiring speed varying information of a speed-varied video, where the speed varying information is used to represent a playing speed change of the speed-varied video; performing reverse speed-varying processing on the speed-varied video according to the speed varying information to obtain an original speed video; displaying the original speed video, and synchronously performing video shooting to generate an original speed target video; and performing speed varying processing on the original speed target video according to the speed varying information to obtain a target speed-varied video.

20 Claims, 13 Drawing Sheets

(56) References Cited

U.S. PATENT DOCUMENTS

2016/0225405 A1* 8/2016 Matias ................. G11B 27/022
2018/0348992 A1* 12/2018 Ku ..................... G06F 3/04847
2020/0296453 A1    9/2020 Liu

FOREIGN PATENT DOCUMENTS

| | | |
|---|---|---|
| CN | 108566519 A | 9/2018 |
| CN | 108600615 A | 9/2018 |
| CN | 108616696 A | 10/2018 |
| CN | 108900771 A | 11/2018 |
| CN | 108900897 A | 11/2018 |
| CN | 108965705 A | 12/2018 |
| CN | 109451248 A | 3/2019 |
| CN | 109845245 A | 6/2019 |
| CN | 110797055 A | 2/2020 |
| JP | 2004007543 A | 1/2004 |

OTHER PUBLICATIONS

China National Intellectual Property Administration, International Search Report and Written Opinion in Application No. PCT/CN2022/072403, dated Mar. 16, 2022, WIPO, 13 pages.
China National Intellectual Property Administration, Notification of Grant of Patent Rights Issued in Application No. 202110080508.7, dated Apr. 27, 2023, 5 pages. Submitted with partial English translation.

* cited by examiner

VIDEO RECORDING METHOD AND DEVICE, ELECTRONIC DEVICE AND STORAGE MEDIUM

CROSS-REFERENCES TO RELATED APPLICATIONS

The present application is a continuation of International Application No. PCT/CN2022/072403, filed on Jan. 17, 2022, which claims priority to Chinese Patent Application No. 202110080508.7, filed with the China National Intellectual Property Administration on Jan. 21, 2021 and entitled "Video Recording Method and Device, Electronic Device and Storage Medium". The content of the above applications are hereby incorporated by reference in their entireties.

TECHNICAL FIELD

Embodiments of the present disclosure relate to the field of multimedia technologies and, in particular, to a video recording method and device, an electronic device and a storage medium.

BACKGROUND

At present, in a short video platform, video creations uploaded by users have become a main content source of the platform. A user can record and upload a video through a mobile terminal such as a mobile phone, and an interesting video creation can be formed by adding different video special effects.

In order to lower a threshold and difficulty for the user to create a video creation, some applications (APP) provide the user with a video template for adding a video special effect, and the user can complete video recording by imitating a time sequence and a rhythm of video recording in the video template, so that a recorded video can be directly matched with the video special effect in the video template, thus quickly adding the video special effect to the recorded video.

However, for a video material in some video templates with a speed varying special effect, a playing speed of the video material will change under an influence of the speed varying special effect. When the user uses such a video template to shoot a video, a time point at which the special effect appears in the video template cannot be accurately matched, resulting in a problem that the video special effect does not match video content, and video quality is thus affected.

SUMMARY

Embodiments of the present disclosure provide a video recording method and device, an electronic device, a storage medium, a computer program product and a computer program, so as to solve the problem that when a user records a video according to a video template, a video special effect does not match video content and video quality is thus affected.

In a first aspect, an embodiment of the present disclosure provides a video recording method, including:
performing reverse speed-varying processing on a speed-varied video to obtain an original speed video; displaying the original speed video, and synchronously performing video shooting to generate an original speed target video; and performing speed varying processing on the original speed target video to obtain a target speed-varied video, where a playing speed change of the target speed-varied video is consistent with a playing speed change of the speed-varied video.

In a second aspect, an embodiment of the present disclosure provides a video recording device, including:
a reverse speed-varying unit, configured to perform reverse speed-varying processing on a speed-varied video to obtain an original speed video;
a generating unit, configured to display the original speed video, and synchronously perform video shooting to generate an original speed target video; and
a speed varying unit, configured to perform speed varying processing on the original speed target video to obtain a target speed-varied video, where a playing speed change of the target speed-varied video is consistent with a playing speed change of the speed-varied video.

In a third aspect, an embodiment of the present disclosure provides an electronic device including at least one processor and a memory;
the memory stores computer-executed instructions; and
the at least one processor executes the computer-executed instructions stored in the memory to cause the at least one processor to execute the video recording method according to the first aspect and various possible designs of the first aspect.

In a fourth aspect, an embodiment of the present disclosure provides a computer-readable storage medium, the computer-readable storage medium stores computer-executed instructions, and when a processor executes the computer-executed instructions, the video recording method according to the first aspect and various possible designs of the first aspect are implemented.

In a fifth aspect, an embodiment of the present disclosure provides a computer program product, including a computer program, and when the computer program is executed by a processor, the video recording method according to the first aspect and various possible designs of the first aspect are implemented.

In a sixth aspect, an embodiment of the present disclosure provides a computer program, the computer program is stored in a readable storage medium, and at least one processor of an electronic device can read the computer program from the readable storage medium, and the at least one processor executes the computer program to cause the electronic device to execute the video recording method according to the first aspect and various possible designs of the first aspect.

In the video recording method and device, the electronic device and the storage medium provided by the embodiments, by performing reverse speed-varying processing on the speed-varied video to obtain an original speed video; displaying the original speed video, and synchronously performing video shooting to generate an original speed target video; and performing speed varying processing on the original speed target video to obtain a target speed-varied video, since a playing speed of the original speed video obtained by reverse speed varying is the same as a normal speed of a video recorded by a user, by displaying the original speed video to the user to guide the user to record the video, the video recorded by the user can be synchronized with the original speed-varied video, and then a special effect in a template can be matched with video content shot by the user, so that the special effect in the original speed-varied video is directly available for the video recorded by the user, thereby solving the problem that the video special effect does not match the video content, and improving the special effect performance of the video recorded by the user.

BRIEF DESCRIPTION OF THE DRAWINGS

In order to illustrate the technical solutions in embodiments of the present disclosure or in related art more clearly, drawings required for describing the embodiments or the related art will be introduced briefly in the following. It is obvious that the drawings in the following description show some embodiments of the present disclosure. For those skilled in the art, other drawings may also be obtained based on these drawings without creative efforts.

DESCRIPTION OF EMBODIMENTS

In order to make the purposes, technical solutions and advantages of embodiments of the present disclosure clearer, the technical solutions in the embodiments of the present disclosure will be described clearly and comprehensively in conjunction with the accompanying drawings in the embodiments of the present disclosure. Obviously, the described embodiments are part of the embodiments of the present disclosure, but not all of the embodiments. Based on the embodiments in the present disclosure, all other embodiments obtained by those of ordinary skill in the art without creative efforts belong to the protection scope of the present disclosure.

Figure 1:
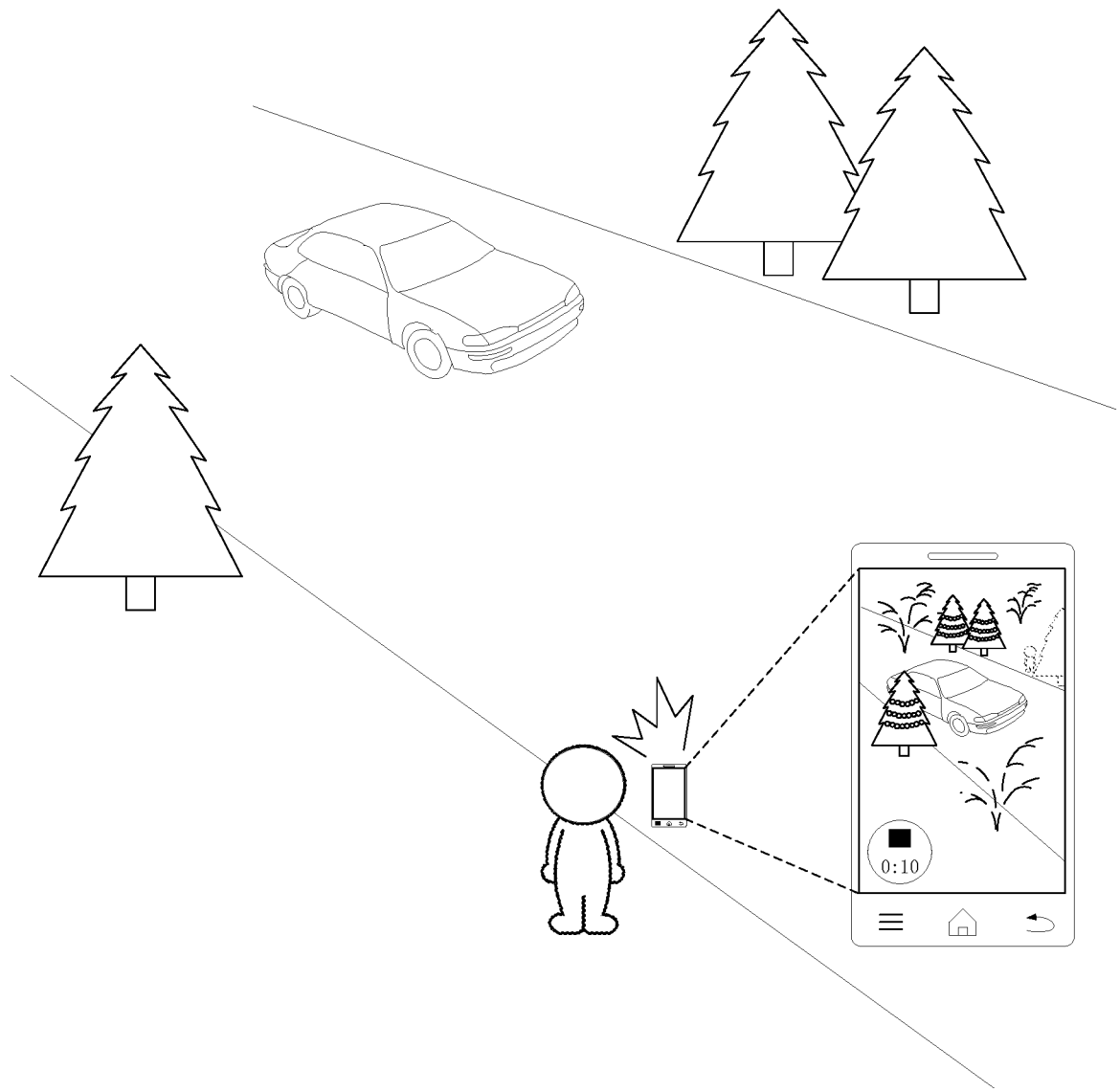
FIG. 1 is a schematic diagram of an application scenario provided by an embodiment of the present disclosure.

FIG. 1 is a schematic diagram of an application scenario provided by an embodiment of the present disclosure. Referring to FIG. 1, in this application scenario, a video recording method provided by an embodiment of the present disclosure is applied to a mobile terminal device, such as a smartphone, as illustrated below with a smartphone as an example. The smartphone runs with an APP for recording a video, a user uses the APP to record a video by operating the smartphone, and adds a special effect to a recorded video through a special effect function built in the APP, and finally generates a video creation. The video creation can be saved in the smartphone of the user, played, edited, disseminated or deleted locally, or saved in a cloud server for other visiting users to watch.

Figure 2:
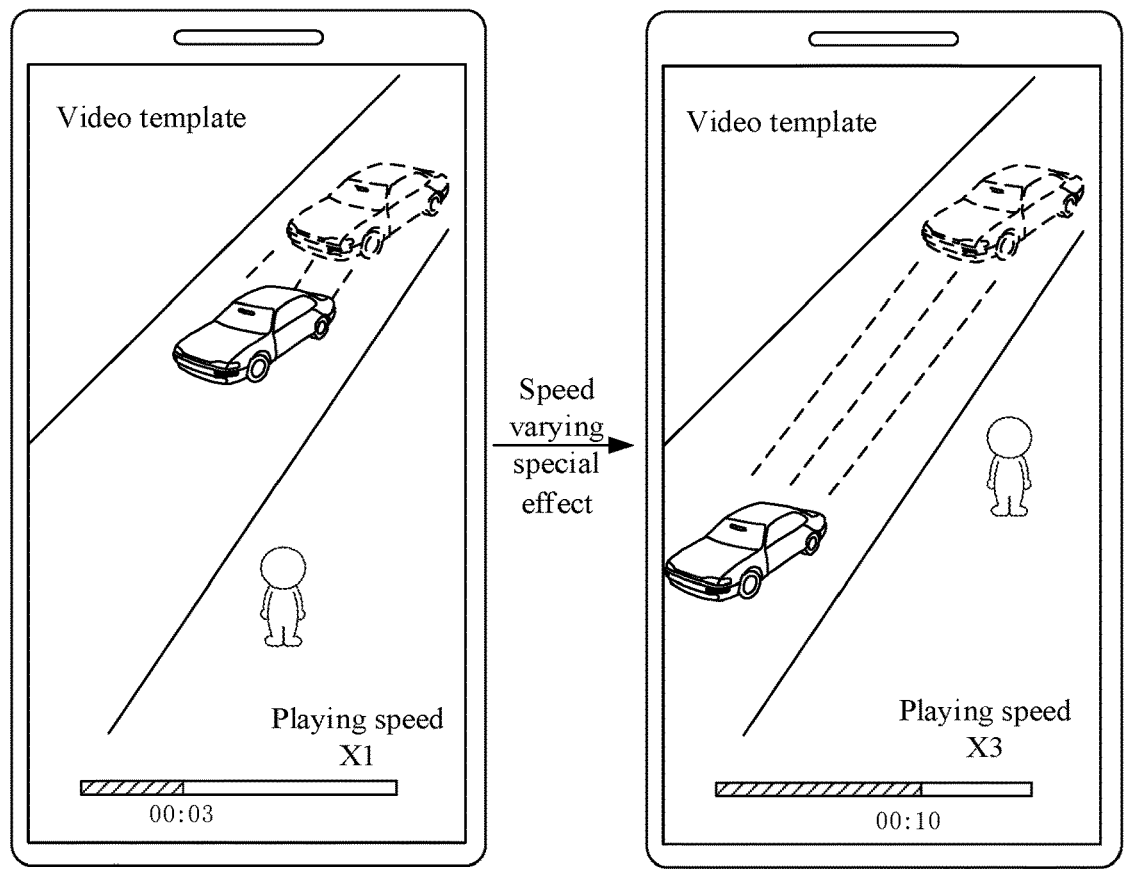
FIG. 2 is a schematic diagram of playing a video template with a speed varying special effect in the related art.

In the related art, in order to lower a threshold and difficulty for the user to create a video creation, some APPs provide the user with a video template for adding a video special effect, and the user can complete video recording by imitating a time sequence and a rhythm of video recording in the video template, so that a recorded video can be directly matched with the video special effect in the video template, thus quickly adding the video special effect to the recorded video. However, for a video material in some video templates with a speed varying special effect, a playing speed of the video material will change under an influence of the speed varying special effect. FIG. 2 is a schematic diagram of playing a video template with a speed varying special effect in the related art. Referring to FIG. 2, when the user uses such kind of video template for video shooting, the playing speed of the video material in the video template is sometimes fast and sometimes slow instead of maintaining an original recording speed of the video material, but the user can only record a video at a relatively constant speed. Therefore, when the user imitates the video material in the video template for video recording, a time point at which the special effect appears in the video template cannot be accurately matched, resulting in a problem that the video special effect does not match video content, and video quality is thus affected.

An embodiment of the present disclosure provides a video recording method to solve the above problem.

Figure 3:
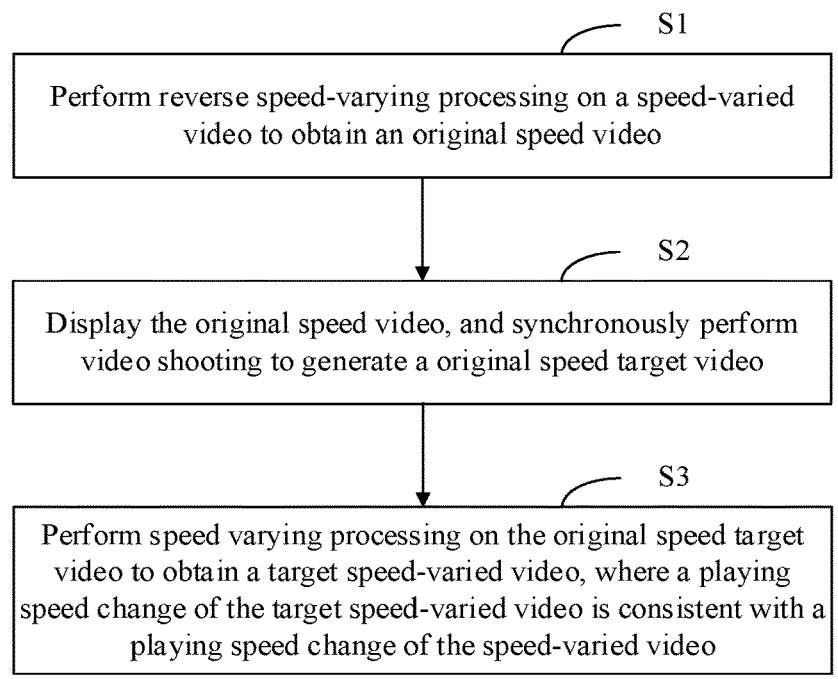
FIG. 3 is schematic flowchart I of a video recording method provided by an embodiment of the present disclosure.

Please refer to FIG. 3. FIG. 3 is schematic flowchart I of a video recording method provided by an embodiment of the present disclosure. The method of the present embodiment can be applied to a mobile terminal device, such as a smartphone, and the video recording method includes the following steps.

S1: perform reverse speed-varying processing on a speed-varied video to obtain an original speed video.

Specifically, speed-varied video refers to video data obtained by speed varying processing on a video material, i.e., on an original video. In a possible implementation, when the speed-varied video is played, a playing speed presents a nonlinear change. For example, the speed-varied video is played at a normal playing speed in 0-3rd seconds of the speed-varied video, at twice the speed in 3rd-5th seconds, and at 0.5 times the speed in 5th-7th seconds. Through a speed-varied playing of the speed-varied video, the video presents a speed varying special effect, which increases the expressiveness and interest of the video. "Original Speed" in the original speed video is a speed relative to "speed-varied" in the speed-varied video, so the original speed video is not necessarily of the same data as the speed-varied video.

In an implementation, before S1, the video recording method further includes: acquiring speed varying information of the speed-varied video, where the speed varying information is used to represent a playing speed change of the speed-varied video. In an implementation, the reverse speed-varying processing is performed on the speed-varied video according to the speed varying information to obtain the original speed video.

S2: display the original speed video, and synchronously perform video shooting to generate an original speed target video.

Illustratively, the user can record the video according to a video recording time sequence shown in the original speed video by operating the terminal device that executes the video recording method provided in the embodiment, to obtain the original speed target video having a same playing duration as the original speed video.

S3: perform speed varying processing on the original speed target video to obtain a target speed-varied video, where a playing speed change of the target speed-varied video is consistent with a playing speed change of the speed-varied video.

Illustratively, recording time nodes of the original speed target video and the original speed video are similar or consistent, so a video special effect corresponding to the original speed video can be applied to the original speed target video to obtain the original speed target video having the same video special effect as the speed-varied video. In an implementation, the speed varying processing is performed on the original speed target video according to the speed varying information to obtain a target speed-varied video.

In this embodiment, by performing reverse speed-varying processing on the speed-varied video to obtain an original speed video; displaying the original speed video, and synchronously performing video shooting to generate an original speed target video; and performing speed varying processing on the original speed target video to obtain a target speed-varied video, since a playing speed of the original speed video obtained by reverse speed varying is the same as a normal speed of a video recorded by a user, by displaying the original speed video to the user to guide the user to record the video, the video recorded by the user can be synchronized with the original speed-varied video, and then a special effect in a template can be matched with video content shot by the user, so that the special effect in the original speed-varied video is directly available for the video recorded by the user, thereby solving the problem that the video special effect does not match the video content, and improving the special effect performance of the video recorded by the user.

Figure 4:
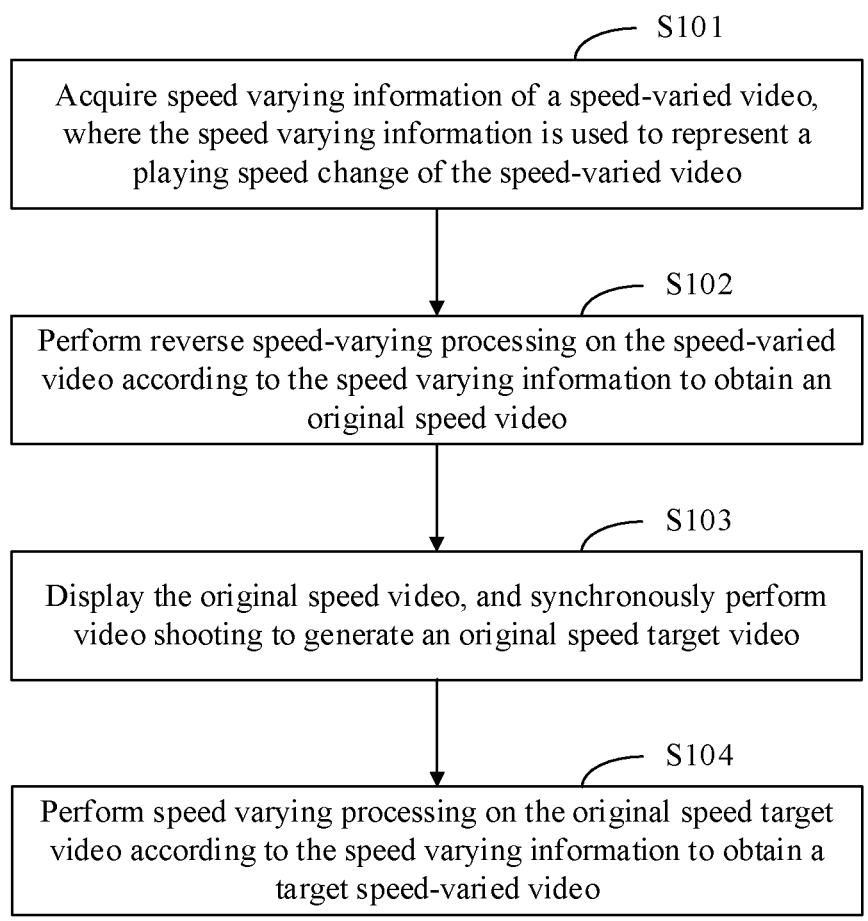
FIG. 4 is schematic flowchart II of a video recording method provided by an embodiment of the present disclosure.

Please refer to FIG. 4. FIG. 4 is schematic flowchart II of a video recording method provided by an embodiment of the present disclosure. The method of the present embodiment can be applied to a mobile terminal device, such as a smartphone, and the video recording method includes the following steps.

S101: acquire speed varying information of a speed-varied video, where the speed varying information is used to represent a playing speed change of the speed-varied video.

Illustratively, video generally refers to a multimedia file including audio data and video data, where the audio and video data may have multiple formats according to different audio and video compression processing methods. The video data is of, for example, an audio video interleaved (AVI) format, a movie digital video technology format, etc. The audio data is of, for example, an advanced audio coding (ACC) format, etc. Here, a specific data format of video and a combination of audio and video data formats are not limited.

Specifically, speed-varied video refers to video data obtained by speed varying processing on a video material, i.e., on an original video. In a possible implementation, when the speed-varied video is played, a playing speed presents a nonlinear change. For example, the speed-varied video is played at a normal playing speed in 0-3rd seconds of the speed-varied video, at twice the speed in 3rd-5th seconds, and at 0.5 times the speed in 5th-7th seconds. Through a speed-varied playing of the speed-varied video, the video presents a speed varying special effect, which increases the expressiveness and interest of the video. It should be noted that the speed-varied video includes video data and audio data, and playing of the speed-varied video at a varied speed includes following possible speed-varied playing performances: the video data is played at a varied speed, and the audio data is played at an original speed; the video data is played at an original speed, and the audio data is played at a varied speed; both the video data and the audio data are played at a varied speed.

There are various ways to obtain the speed varying information of the speed-varied video. For example, according to preset mapping information, speed varying information corresponding to identifier information of the speed-varied video is determined and obtained from a local storage or a cloud storage. For another example, the speed varying information of the speed-varied video is obtained by obtaining a video template including the speed-varied video and corresponding speed varying information. Here, obtaining of the speed varying information can be set according to specific needs and is not specifically limited herein.

S102: perform reverse speed-varying processing on the speed-varied video according to the speed varying information to obtain an original speed video.

Figure 5:
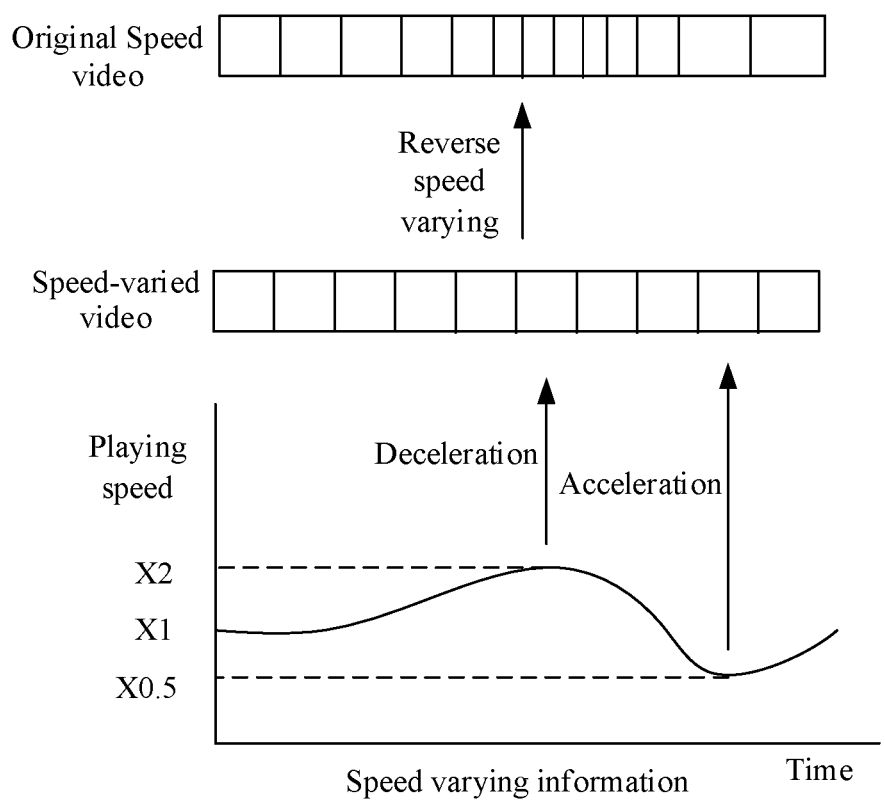
FIG. 5 is a schematic diagram of performing reverse speed-varying processing on a speed-varied video according to speed varying information.

Specifically, the speed varying information is information used to represent the playing speed change of the speed-varied video, and is equivalent to a mapping relationship of a speed change between the original speed video and the speed-varied video. FIG. 5 is a schematic diagram of performing reverse speed-varying processing on a speed-varied video according to speed varying information. Referring to FIG. 5, according to a description of the playing speed of the speed-varied video in the speed varying information, playing frames of an accelerated part of the speed-varied video may be increased by interpolation fitting, so as to achieve a deceleration of this part. Playing frames of a deceleration part of the speed-varied video are reduced by sampling, so as to achieve an acceleration of this part. Finally, the reverse speed-varying processing of the speed-varied video is implemented, and the original speed video is obtained.

"Original Speed" in the original speed video is a speed relative to "speed-varied" in the speed-varied video, so the original speed video is not necessarily of the same data as the speed-varied video. For example, if video data in the speed-varied video is a video played at a varied speed of the video material, and audio data is an audio played at an original speed of the audio data, then for the original speed video obtained by the reverse speed-varying processing, video data is a video played at an original speed of the video material, and audio data is an audio played at a varied speed of the audio data. Here, a specific playing speed of video data and audio data in the original speed video is not limited, and can be set according to specific application scenarios. In addition, since the original speed video is obtained by the reverse speed-varying processing on the speed-varied video which undergoes a process of up-sampling and down-sampling in interpolation and sampling etc., a duration of the original speed video obtained by the reverse speed-varying processing is not quite equal to that of the speed-varied video.

S103: display the original speed video, and synchronously perform video shooting to generate an original speed target video.

Figure 6:
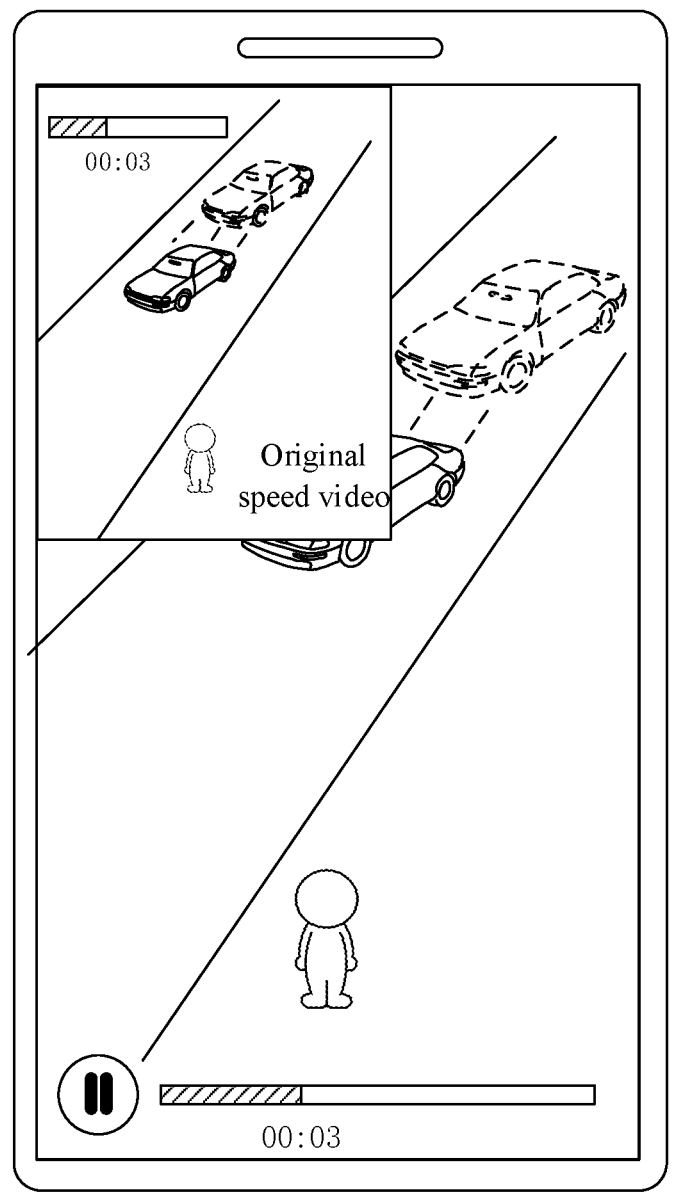
FIG. 6 is a schematic diagram of displaying an original speed video and synchronously performing video shooting provided by an embodiment of the present disclosure.

Illustratively, FIG. 6 is a schematic diagram of displaying an original speed video and synchronously performing video shooting provided by an embodiment of the present disclosure. Referring to FIG. 6, after the original speed video is obtained, a playing speed of audio and/or video content in the original speed video matches a speed at a time of recording a video at a normal speed. Therefore, the user can record the video according to a video recording time sequence shown in the original speed video by operating the terminal device that executes the video recording method provided in the embodiment, to obtain the original speed target video having a same playing duration as the original speed video.

S104: perform speed varying processing on the original speed target video according to the speed varying information to obtain a target speed-varied video.

Illustratively, recording time nodes of the original speed target video and the original speed video are similar or consistent, so a video special effect corresponding to the original speed video can be applied to the original speed target video to obtain the original speed target video having the same video special effect as the speed-varied video. A time node where a video special effect need to appear in the original speed target video is the same as a time node where the special effect appears in the speed-varied video obtained by speed varying of the original speed video. Therefore, a reverse transformation based on the speed varying information is applicable to the original speed target video, and the target speed-varied video with the same special effect as the speed-varied video can be obtained by performing speed varying processing on the original speed target video according to the speed varying information.

In this embodiment, by acquiring speed varying information of a speed-varied video, where the speed varying information is used to represent a playing speed change of the speed-varied video; performing reverse speed-varying processing on the speed-varied video according to the speed varying information to obtain an original speed video; displaying the original speed video, and synchronously performing video shooting to generate an original speed target video; and performing speed varying processing on the original speed target video according to the speed varying information to obtain a target speed-varied video, since a playing speed of the original speed video obtained by reverse speed varying is the same as a normal speed of a video recorded by a user, by displaying the original speed video to the user to guide the user to record the video, the video recorded by the user can be synchronized with the original speed-varied video, and then a special effect in a template can be matched with video content shot by the user, so that the special effect in the original speed-varied video is directly available for the video recorded by the user, thereby solving the problem that the video special effect does not match the video content, and improving the special effect performance of the video recorded by the user.

Figure 7:
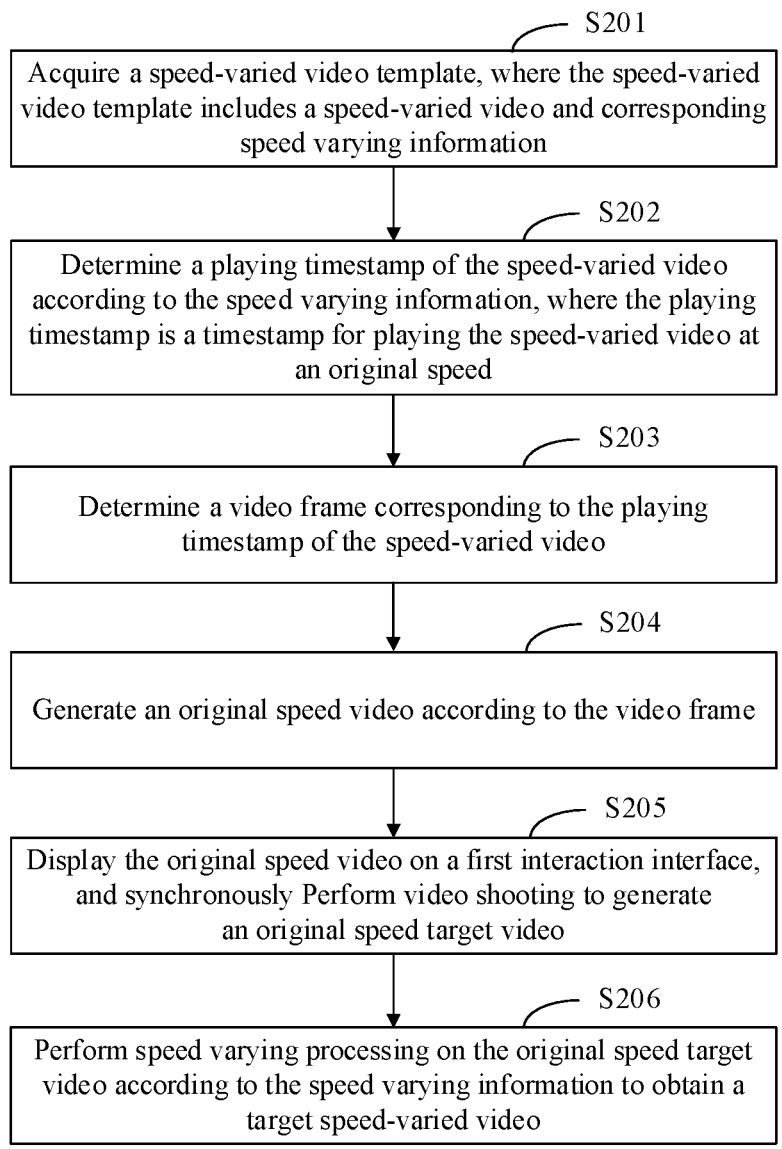
FIG. 7 is schematic flowchart III of a video recording method provided by an embodiment of the present disclosure.

FIG. 7 is schematic flowchart III of a video recording method provided by an embodiment of the present disclosure. The present embodiment further refines processes of steps S101-S103 based on the embodiment shown in FIG. 4. The video recording method includes the following steps.

S201: acquire a speed-varied video template, where the speed-varied video template includes a speed-varied video and corresponding speed varying information.

The speed varying information includes a video speed varying model. The video speed varying model is used to represent a mapping relationship between a playing speed and a playing time of the speed-varied video. Illustratively, the speed-varied video template may be a preset template file. The speed-varied video template may be user-defined, or preset in an APP of a mobile terminal device. In an implementation, the user may edit, add and delete the speed-varied video template through a user interface (UI) of the APP. The speed-varied video template includes the speed-varied video and the corresponding video speed varying model, and the speed varying model can be used to describe the mapping relationship between the playing speed and the playing time of the speed-varied video.

Illustratively, the video speed varying model is used to represent a law of variation of the playing speed of the speed-varied video, and there are many specific implementations of the speed varying model. For example, the video speed varying model may be a function of the varied playing speed of the speed-varied video, and an identifier of each data frame of the speed-varied video corresponds to a playing speed coefficient. For another example, the speed varying model may be a two-dimensional array, and the array stores some specific time nodes and corresponding playing speed coefficients of the speed-varied video. Specifically, for example, a speed varying coefficient of 2 corresponds to the 1st second of the speed-varied video; a speed varying coefficient of 2.5 corresponds to the 1.5th second of the speed-varied video; a speed varying coefficient of 0.5 corresponds to the 3rd second of the speed-varied video. The speed varying coefficient is used to represent a ratio of a varied playing speed to a normal playing speed. A specific implementation form of the video speed varying model can be set as required, and is not specifically limited here.

Figure 8:
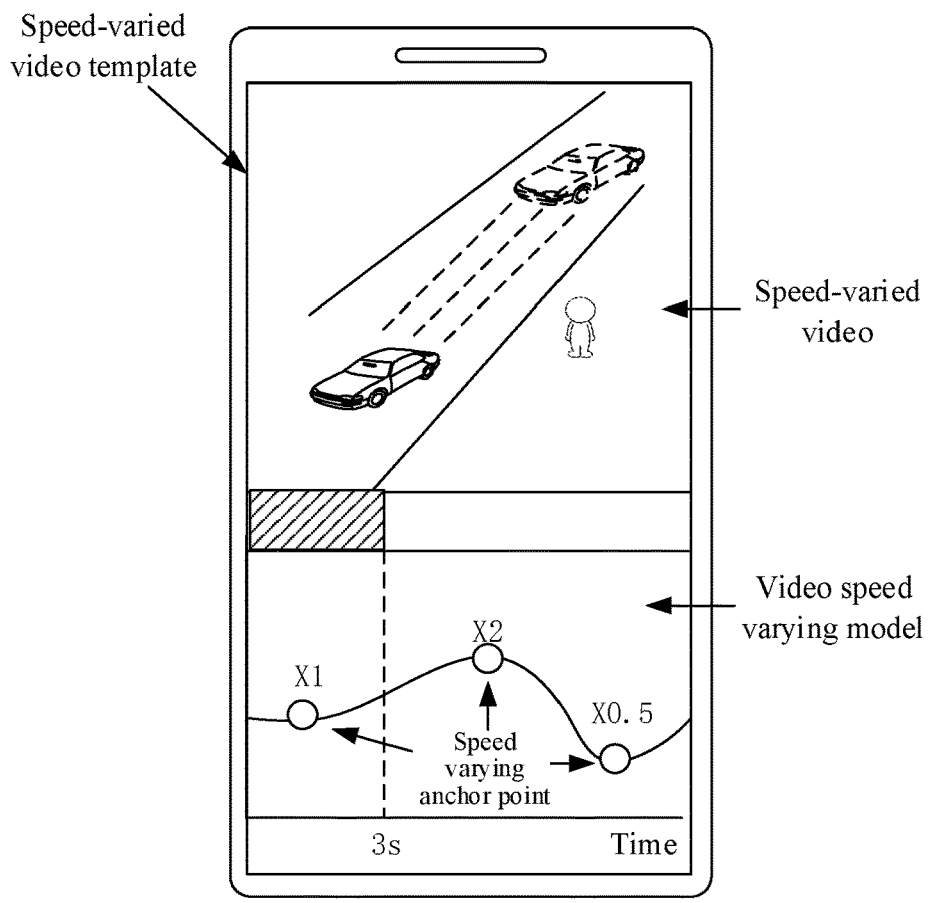
FIG. 8 is a schematic diagram of an implementation of a speed-varied video template on an UI provided by an embodiment of the present disclosure.

FIG. 8 is a schematic diagram of an implementation of a speed-varied video template on an UI provided by an embodiment of the present disclosure. Referring to FIG. 8, on the UI of the APP, in a possible implementation, the video speed varying model includes a speed varying anchor point of the speed-varied video and a playing speed corresponding to the speed varying anchor point. The speed-varied video in the speed-varied video template and the video speed varying model are set relative to each other on a time axis. The video speed varying model includes several speed varying anchor points to represent a playing speed of the speed-varied video at a specific playing time point, and a fitting curve is formed through the speed varying anchor points to indicate a speed change of the speed-varied video.

S202: determine a playing timestamp of the speed-varied video according to the speed varying information, where the playing timestamp is a timestamp for playing the speed-varied video at an original speed.

Figure 9:
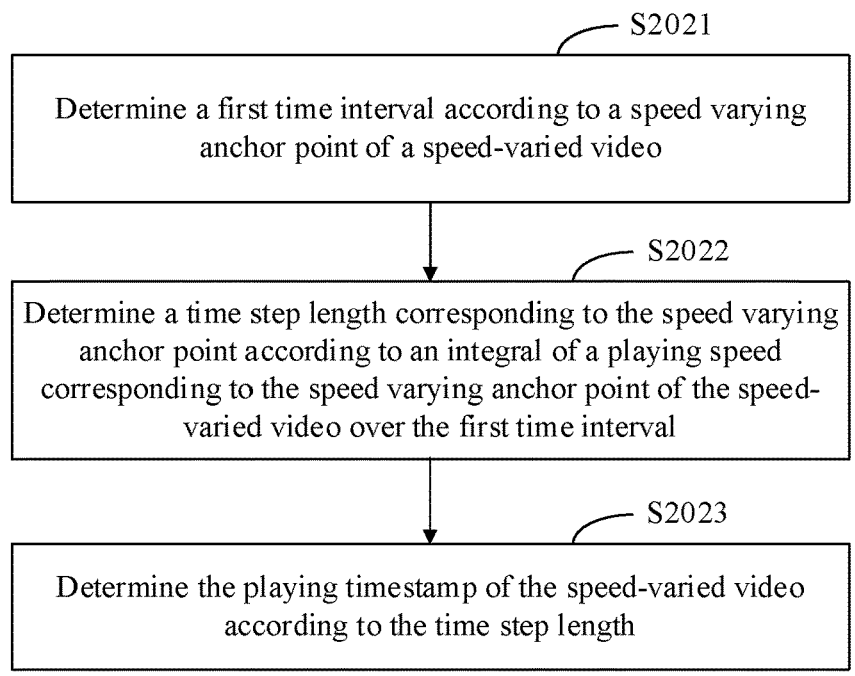
FIG. 9 is a possible schematic flowchart of step S202 in the embodiment shown in FIG. 7.

In a possible implementation, as shown in FIG. 9, step S202 includes the following specific steps.

S2021: determine a first time interval according to the speed varying anchor point of the speed-varied video.

S2022: determine a time step length corresponding to the speed varying anchor point according to an integral of the playing speed corresponding to the speed varying anchor point of the speed-varied video over the first time interval.

S2023: determine the playing timestamp of the speed-varied video according to the time step length.

Figure 10:
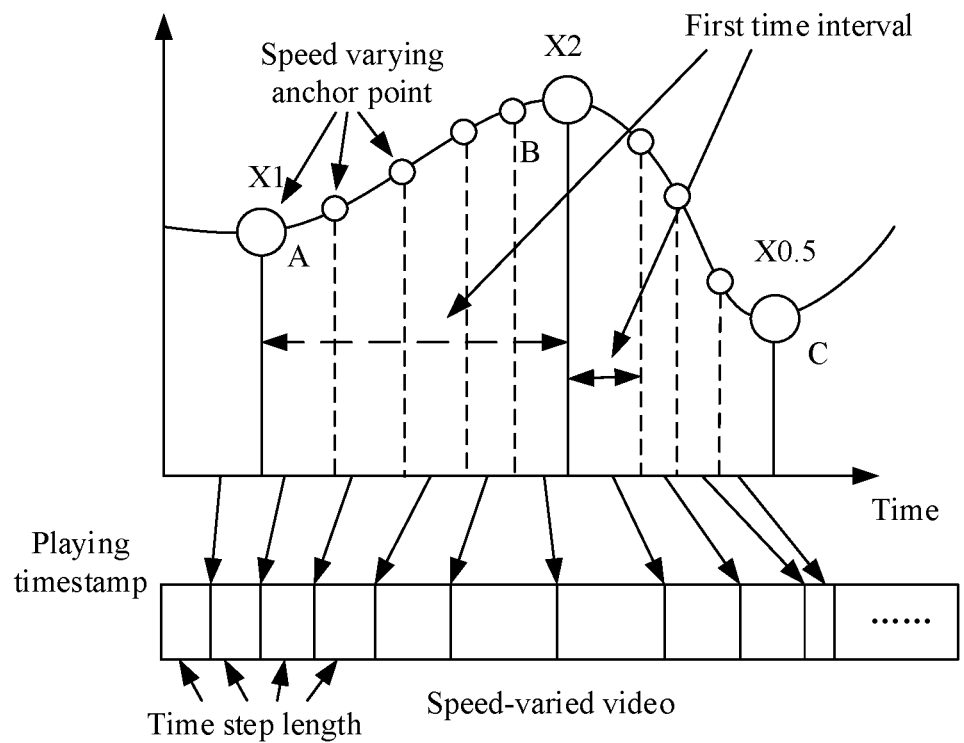
FIG. 10 is a schematic diagram of a playing timestamp of a speed-varied video provided by an embodiment of the present disclosure.

FIG. 10 is a schematic diagram of a playing timestamp of a speed-varied video provided by an embodiment of the present disclosure, and steps S2021-S2023 will be specifically introduced with reference to FIG. 10.

Referring to FIG. 10, the first time interval is determined according to an interval between the speed varying anchor points corresponding to the speed-varied video. When the interval between the speed varying anchor points is different, the corresponding first time interval is also different. In a possible implementation, a derivative of a fitting curve at the speed varying anchor points is 0. Then, the time step length corresponding to the speed varying anchor point is determined by integration of the playing speed corresponding to each speed varying anchor point over the first time interval. Specifically, a playing speed value corresponding to a speed varying anchor point interpolated on the fitting curve can be determined according to the fitting curve through the speed varying anchor points, and then a product of a unit time interval and a corresponding speed value can be calculated, and all products between two speed varying anchor points are accumulated to obtain the time step length between the two speed varying anchor points. Further, a mapping is performed to the speed-varied video according to the time step length to determine the playing timestamp of the speed-varied video. It can be found from FIG. 10 that in an A-B segment, corresponding to an accelerated playing part of the speed-varied video, integral calculation results are large, so playing timestamps on the speed-varied video are sparse. In a second half of a B-C segment, corresponding to a decelerated playing part of the speed-varied video, integral calculation results are small, so playing timestamps on the speed-varied video are dense.

S203: determine a video frame corresponding to the playing timestamp of the speed-varied video.

Illustratively, the speed-varied video is composed of multiple video frames, and the video frame is the minimum playing unit of the speed-varied video. In a possible implementation, the method for determining the video frame corresponding to the playing timestamp of the speed-varied video includes: decoding the speed-varied video according to the playing timestamp, specifically, positioning in the speed-varied video according to a video position indicated by the playing timestamp, and decoding video data at a corresponding position to obtain the video frame corresponding to the playing timestamp.

Figure 11:
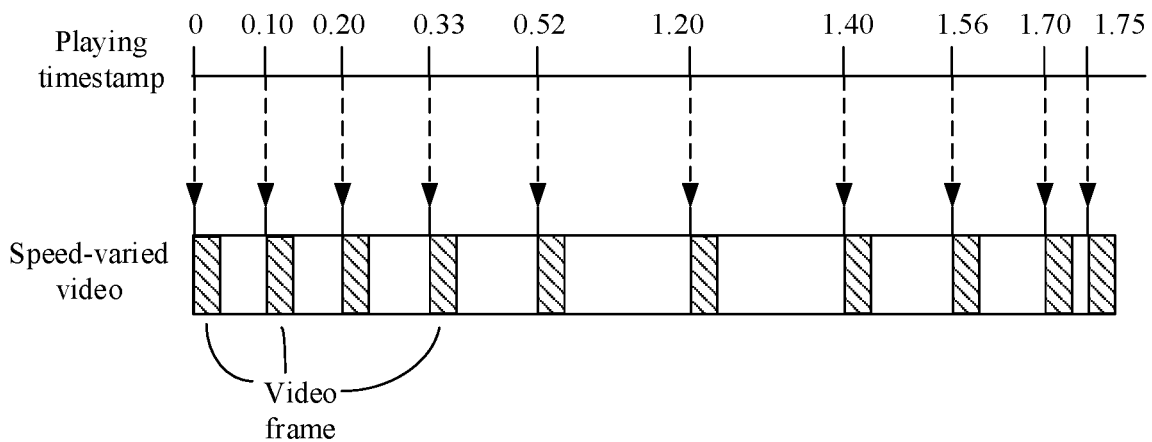
FIG. 11 is a schematic diagram of a process for determining a video frame provided by an embodiment of the present disclosure.

FIG. 11 is a schematic diagram of a process for determining a video frame provided by an embodiment of the present disclosure. Referring to FIG. 11, specifically, the playing timestamp is information used to represent a playing position of video data of an original video material. Before playing the video material, the video needs to be decoded, and a video decoding position is a position corresponding to the playing timestamp. After the video decoding position is determined, decoding at the video decoding position to obtain a video frame corresponding to the playing timestamp, and a specific implementation process exists in the related art of the field, and is not repeated here.

S204: generate the original speed video according to the video frame.

Figure 12:
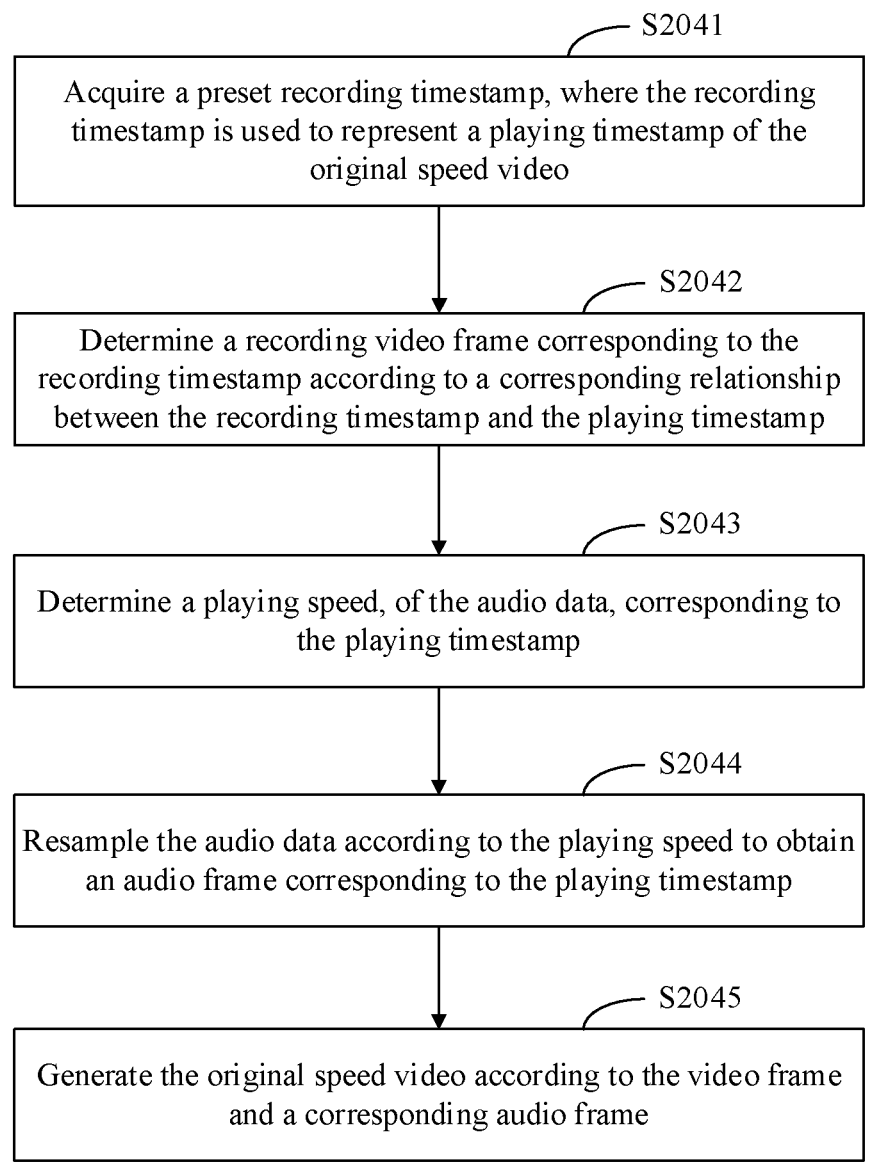
FIG. 12 is a possible schematic flowchart of step S204 in the embodiment shown in FIG. 7.

Illustratively, as shown in FIG. 12, step S204 includes the following specific steps.

S2041: acquire a preset recording timestamp, where the recording timestamp is used to represent a playing timestamp of the original speed video.

S2042: determine a recording video frame corresponding to the recording timestamp according to a corresponding relationship between the recording timestamp and the playing timestamp.

Illustratively, the recording timestamp is a timestamp generated by a terminal device according to an image sampling rate when a user uses the terminal device for video recording. More specifically, for example, the recording timestamp includes a sequence of time points with a length of 1,000, and an interval between the time points is 33 milliseconds, that is, a first time point is at 0 millisecond, a second time point is at a 33rd millisecond, a third time point is at a 66th millisecond, and so on. The recording timestamp corresponds to a timestamp at a time of shooting a video at a normal speed, so the recording timestamp represents the playing timestamp of the original speed video.

Further, according to the corresponding relationship between the recording timestamp and the playing timestamp, when a timestamp node in the recording timestamp coincides with a timestamp node in the playing timestamp, it is determined that the recording video frame corresponding to the recording timestamp is a video frame corresponding to the timestamp node; when a timestamp node in the recording timestamp does not coincide with any node of the playing timestamp, it is determined that the recording video frame corresponding to the recording timestamp is a video frame corresponding to a previous timestamp node. That is, since recording timestamps are evenly distributed on a time axis, while playing timestamps are unevenly distributed on a time axis, when a timestamp node of a recording timestamp is the same as a timestamp node of a playing timestamp, a video frame corresponding to the timestamp node is saved as an effective video frame, and when a timestamp node of a recording timestamp is different from any timestamp node of a playing timestamp, a last effective video frame is saved repeatedly, so as to achieve a purpose of video frame insertion. Finally, all saved recording video frames are combined according to the recording timestamp to synthesize the original speed video.

In another possible implementation, the speed-varied video includes audio data, and step S204 further includes the following specific steps.

S2043: determine a playing speed, of the audio data, corresponding to the playing timestamp.

S2044: resample the audio data according to the playing speed to obtain an audio frame corresponding to the playing timestamp.

S2045: generate the original speed video according to the video frame and a corresponding audio frame.

Similar to the video data in the speed-varied video, the playing speed of the audio data corresponds to the speed varying information, that is, the playing speed of the audio data relates to the playing timestamp. When an interval between playing timestamps increases, an audio playing speed increases accordingly. Therefore, according to the interval between the playing timestamps, a playing speed of audio frames in this interval, that is, a playing speed of unit audio data, can be determined.

Further, resampling the audio data according to the playing speed to obtain the audio frame corresponding to the playing timestamp includes: acquiring a preset first audio sampling rate; determining a second audio sampling rate according to the first audio sampling rate and the playing speed of the audio data; resampling the audio data according to the second audio sampling rate to obtain the audio frame corresponding to the playing timestamp. Specifically, the playing speed of the unit audio data can be based on a normal speed, and for example, the playing speed is double speed, triple speed, 0.5 times speed, etc. The first audio sampling rate is an original sampling rate of the audio data. According to the first audio sampling rate and the playing speed of the unit audio data, resampling including up-sampling and down-sampling is performed at the second audio sampling rate, so as to implement speed-up and speed-down in sound, and obtain the audio frame corresponding to the playing timestamp. The following is illustrated by an embodiment.

The speed-varied video includes unit audio data having 44k sampling points and a duration of 1 second (i.e., a sampling rate). At this time, a playing speed corresponding to the unit audio data is twice speed, so it is necessary to speed up the unit audio data twice, that is, only 22k sampling points in the unit audio data are reserved through resampling. Then playing of the unit audio data can be completed in 0.5 seconds, which is equivalent to that the playing speed is twice the speed.

In a possible implementation, a start timestamp of a normal speed playing of a current audio frame corresponds to a start timestamp of a fitting curve variable speed playing in the speed varying information, an end timestamp of the normal speed playing of the current audio frame corresponds to an end timestamp of the fitting curve variable speed playing in the speed varying information. After reverse-curve speed varying of the audio, since a speed varying rate is inconsistent, the number of pieces of unit audio data generated by each resampling is different. Therefore, the unit audio data generated by each resampling is cached in a cache pool, and the unit audio data is stored in the cache pool in chronological order. Then, whether the number of pieces of the unit audio data in the cache pool reaches a preset number of adoption, for example, 1024, is determined. If the preset number is reached, the preset number of adoption of pieces of the unit audio data is taken out to generate one audio frame, and remaining unit audio data is retained in the cache pool until an audio data processing is completed.

It should be noted that in a possible implementation, the speed-varied video can include both the audio data and the video material, and then a generated video frame includes both an audio frame and a video frame. However, in another possible implementation, the speed-varied video may also include only audio data or video material, so as to generate only audio frame or video frame. This can be set according to different application scenarios, and is not specifically limited here.

After video frames are obtained, the original speed video can be obtained by combining the video frames. In a possible implementation, the video frames include audio frames and video frames. In order to make the original speed video composed of audio frames and video frames have well matched sound and image, an audio and video synchronization processing can be performed on the audio and video frames.

Specifically, according to display timestamp information corresponding to an audio frame and a video frame, a correction is made to ensure that a difference between the display timestamp information corresponding to the audio frame and the video frame is less than a preset threshold, so that the audio frame and the video frame can be synchronized. More specifically, in a process of rendering a video, a difference between a display timestamp of an audio frame and a display timestamp of a video frame is calculated in real time. Illustratively, when the difference is positive, it means that the display timestamp of the audio frame is ahead of the display timestamp of the video frame, that is, the audio frame is relatively fast, and at this time, a delay processing is performed on the audio frame. If the difference is negative, it means that the display timestamp of the audio frame is behind the display timestamp of the video frame, that is, the audio frame is relatively slow, and at this time, a delay processing is performed on the video frame, so that the audio frame and the video frame are synchronized.

S205: display the original speed video on a first interaction interface, and synchronously perform video shooting to generate an original speed target video. Specifically, the first interaction interface is a channel for information exchange between people and mobile terminal device. A user input information and operate a mobile terminal device through the first interaction interface, and the mobile terminal device provides information to the user through the interaction interface.

Figure 13:
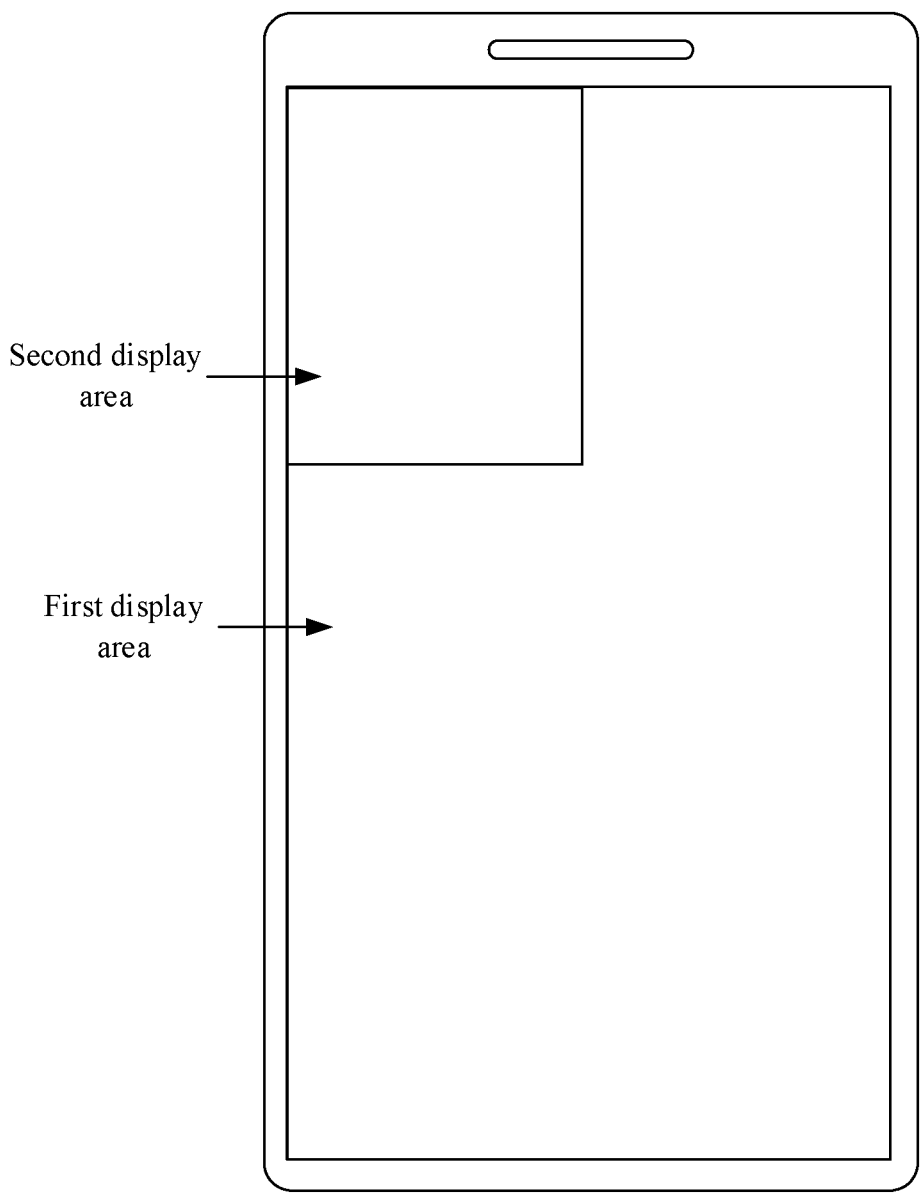
FIG. 13 is a schematic diagram of a first interaction interface provided by an embodiment of the present disclosure.

In the present embodiment, after the original speed video is generated, by playing the original speed video on the first interaction interface, the user can be guided to shoot the video. Illustratively, the first interaction interface may be a user interface within an APP. FIG. 13 is a schematic diagram of a first interaction interface provided by an embodiment of the present disclosure. Referring to FIG. 13, the first interaction interface includes a first display area and a second display area, where a video that the user is currently recording is displayed in the first display area and the original speed video is displayed in the second display area. In an implementation, at the same time, audio data in the original speed video may further be played on the first interaction interface, so as to provide a better guidance function for users.

Figure 14:
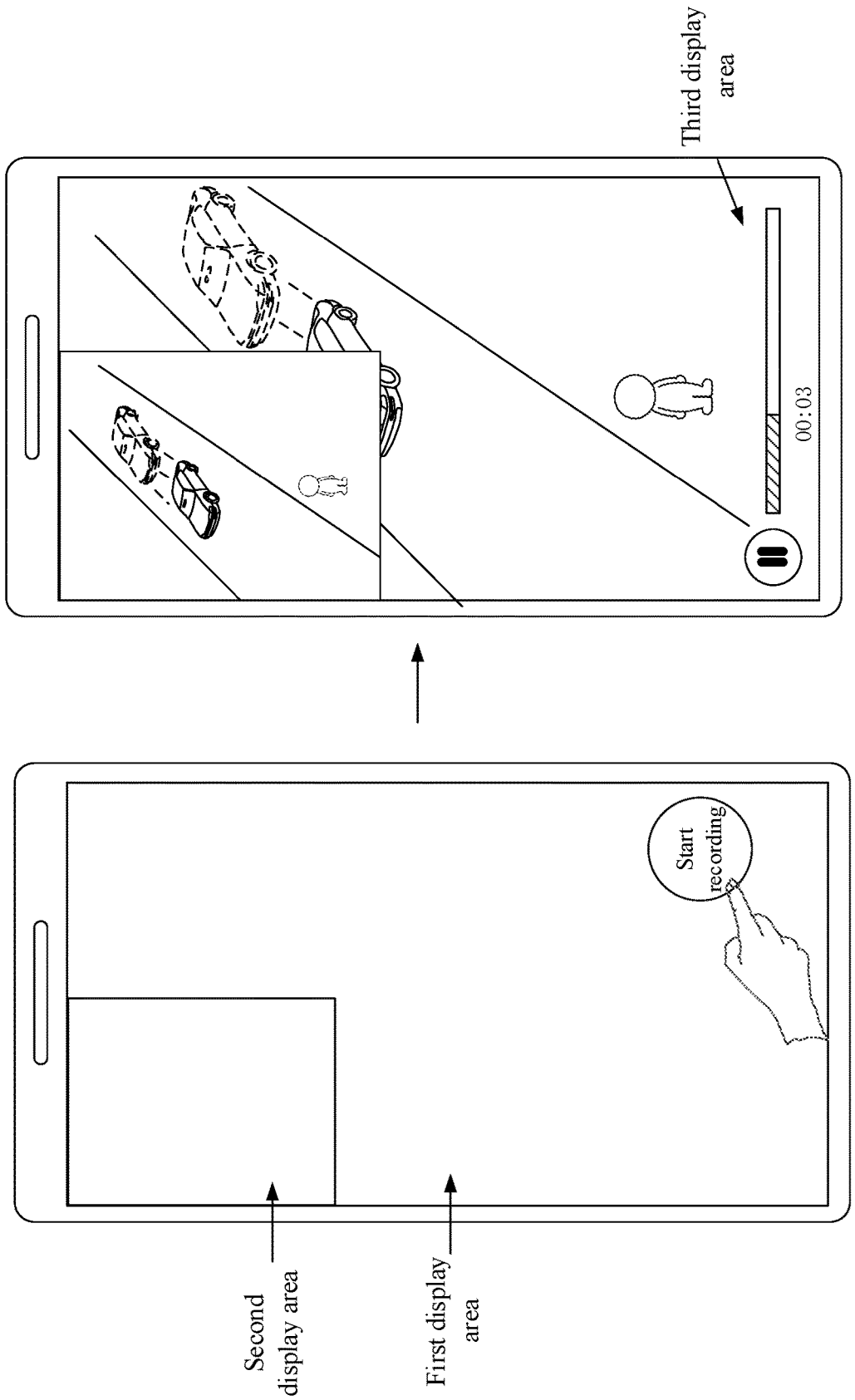
FIG. 14 is a schematic diagram of an operation for generating an original speed target video through video shooting provided by an embodiment of the present disclosure.

Further, when playing the original speed video, the terminal device simultaneously shoots the video to generate the original speed target video. In a possible implementation, FIG. 14 is a schematic diagram of an operation for generating an original speed target video through video shooting provided by an embodiment of the present disclosure. As shown in FIG. 14, when the user clicks a start recording button, the original speed video is played synchronously, and at the same time, the video is started to be recorded. In a third display area of the first interaction interface, time display information is also set, and may be in a form of a progress bar or a form of a time number. Here, the progress bar is taken as an example. The time display information is used to indicate a completed progress or a remaining progress of a currently recorded video relative to the original speed video. When the progress bar comes to the end, an original speed video playing is completed and the original speed target video is generated.

S206: perform speed varying processing on the original speed target video according to the speed varying information to obtain a target speed-varied video.

A recorded original speed target video is the same as or similar to the original speed video in terms of a time sequence and a time node of recorded content. For example, in video data of the original speed video, a recorded character reaches position A at a t1 second, and at this time, special effect α appears corresponding to the character. The recorded character reaches position B at a t2 second, and special effect b appears corresponding to the character at this time. Correspondingly, a recorded character in a video to be processed reaches position A at the t1 second, and reaches position B at the t2 second, matching the video data of the original speed video.

Further, speed varying processing is performed on the original speed target video according to the speed varying information. The speed varying information corresponds to a speed varying special effect of the speed-varied video. Therefore, in generated target video data, as shown in the above example, when the recorded character reaches the position A at the t1 second, special effect α appears corresponding to the character at this time. The recorded character reaches position B at the t2 second, and special effect b appears corresponding to the character at this time. Therefore, a purpose of quickly adding video special effects to the original speed target video is implemented.

Figure 15:
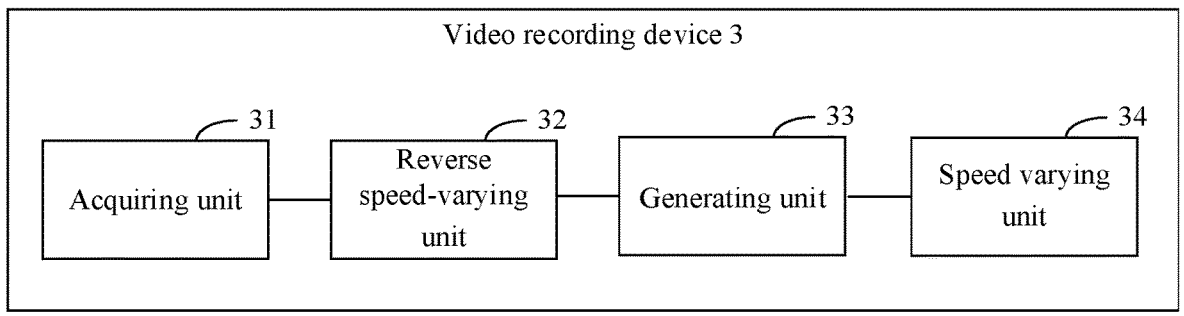
FIG. 15 is structural block diagram I of a video recording device provided by an embodiment of the present disclosure.

Corresponding to the video recording method of the above embodiments, FIG. 15 is structural block diagram I of a video recording device provided by an embodiment of the present disclosure. For ease of description, only parts related to the embodiments of the present disclosure are shown. Referring to FIG. 15, a video recording device 3 includes:
- an acquiring unit 31, configured to acquire speed varying information of a speed-varied video, where the speed varying information is used to represent a playing speed change of the speed-varied video;
- a reverse speed-varying unit 32, configured to perform reverse speed-varying processing on the speed-varied video according to the speed varying information to obtain an original speed video;
- a generating unit 33, configured to display the original speed video, and synchronously perform video shooting to generate an original speed target video; and
- a speed varying unit 34, configured to perform speed varying processing on the original speed target video according to the speed varying information to obtain a target speed-varied video.

The acquiring unit 31, the reverse speed-varying unit 32, the generating unit 33, and the speed varying unit 34 are connected in sequence. The video recording device 3 provided by the present embodiment can implement the technical solution of the method embodiment as shown in FIG. 4, and their implementation principles and technical effects are similar, and are not repeated here.

Figure 16:
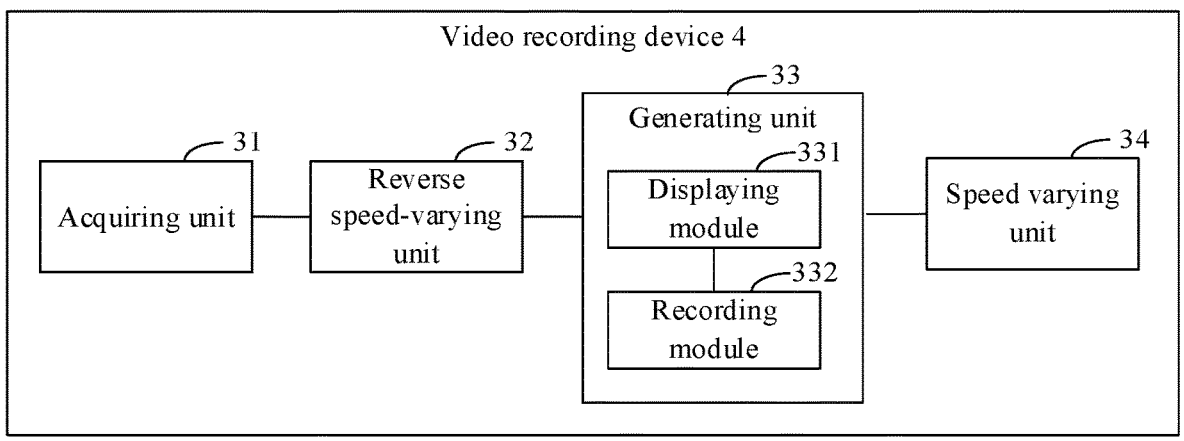
FIG. 16 is structural block diagram II of a video recording device provided by an embodiment of the present disclosure.

FIG. 16 is structural block diagram II of a video recording device provided by an embodiment of the present disclosure. Based on the video recording device shown in FIG. 16, a video recording device 4 provided by the present embodiment further refines the generating unit 33, and further defines functions of the acquiring unit 31 and the reverse speed-varying unit 32.

In a possible implementation, the reverse speed-varying unit 32 is specifically configured to: determine a playing timestamp of the speed-varied video according to the speed varying information, where the playing timestamp is a timestamp for playing the speed-varied video at an original speed; determine a video frame corresponding to the playing timestamp of the speed-varied video; and generate the original speed video according to the video frame.

In a possible implementation, the speed varying information includes a speed varying anchor point of the speed-varied video and a playing speed corresponding to the speed varying anchor point; when determining the playing timestamp of the speed-varied video according to the speed varying information, the reverse speed-varying unit 32 is specifically configured to: determine a first time interval according to the speed varying anchor point of the speed-varied video; determine a time step length corresponding to the speed varying anchor point according to an integral of the playing speed corresponding to the speed varying anchor point of the speed-varied video over the first time interval; and determine the playing timestamp of the speed-varied video according to the time step length.

In a possible implementation, when determining the video frame corresponding to the playing timestamp of the speed-varied video, the reverse speed-varying unit 32 is specifically configured to: decode the speed-varied video according to the playing timestamp to obtain the video frame corresponding to the playing timestamp; and the speed varying unit 34 is specifically configured to: acquire a preset recording timestamp, where the recording timestamp is used to represent a playing timestamp of the original speed video; and determine a recording video frame corresponding to the recording timestamp according to a corresponding relationship between the recording timestamp and the playing timestamp, and synthesize the original speed video from the recording video frame.

In a possible implementation, the speed-varied video includes audio data, and the reverse speed-varying unit 32 is further configured to: determine a playing speed, of the audio data, corresponding to the playing timestamp; and resample the audio data according to the playing speed to obtain an audio frame corresponding to the playing timestamp. The speed varying unit 34 is specifically configured to: generate the original speed video according to the video frame and a corresponding audio frame.

In a possible implementation, when resampling the audio data according to the playing speed to obtain the audio frame corresponding to the playing timestamp, the reverse speed-varying unit 32 is specifically configured to: acquire a preset first audio sampling rate; determine a second audio sampling rate according to the first audio sampling rate and the playing speed of the audio data; and resample the audio data according to the second audio sampling rate to obtain the audio frame corresponding to the playing timestamp.

In a possible implementation, the speed varying unit 34 is further configured to: perform audio-video synchronization on the video frame and the audio frame.

In a possible implementation, the generating unit 33 includes:
- a displaying module 331, configured to display the original speed video on a first interaction interface; and
- a recording module 332, configured to synchronously perform video shooting to generate the original speed target video, when the original speed video is displayed on the first interaction interface.

In a possible implementation, the original speed video includes original speed video data and/or original speed audio data, and the displaying module 331 is specifically configured to: play the original speed video data and/or the original speed audio data on the first interaction interface.

The device provided in the present embodiment can be used to implement the technical solutions of the above method embodiments, and their implementation principles and technical effects are similar, and are not repeated here.

Figure 17:
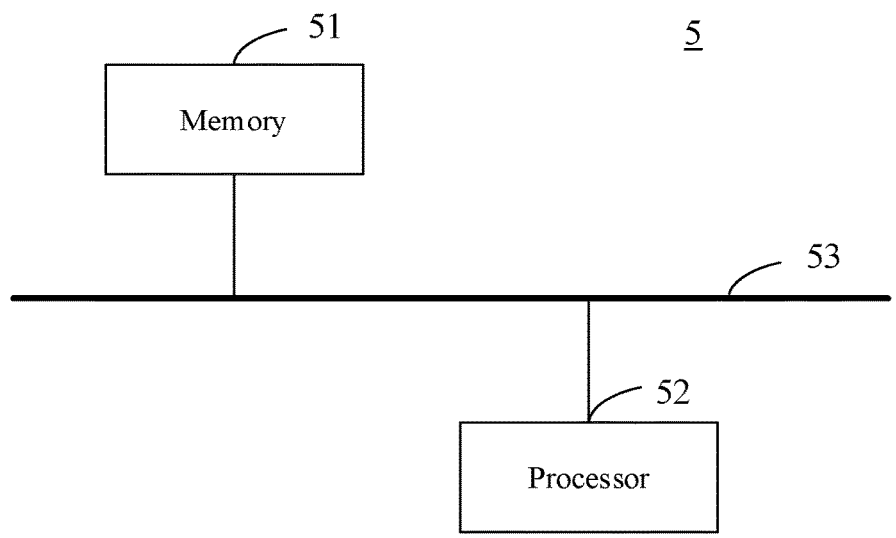
FIG. 17 is a schematic diagram of an electronic device provided by an embodiment of the present disclosure.

FIG. 17 is a schematic diagram of an electronic device provided by an embodiment of the present disclosure. As shown in FIG. 17, an electronic device 5 provided by the present embodiment includes a memory 51, a processor 52 and a computer program.

The computer program is stored in the memory 51 and configured to be executed by the processor 52, so that the video recording method provided by any one of the embodiments corresponding to FIGS. 3-16 of the present disclosure is implemented.

The memory 51 and the processor 52 are connected by a bus 53.

Related descriptions can be understood by referring to the related descriptions and effects of the steps in the embodiments corresponding to FIGS. 2-14, and are not repeated here.

Figure 18:
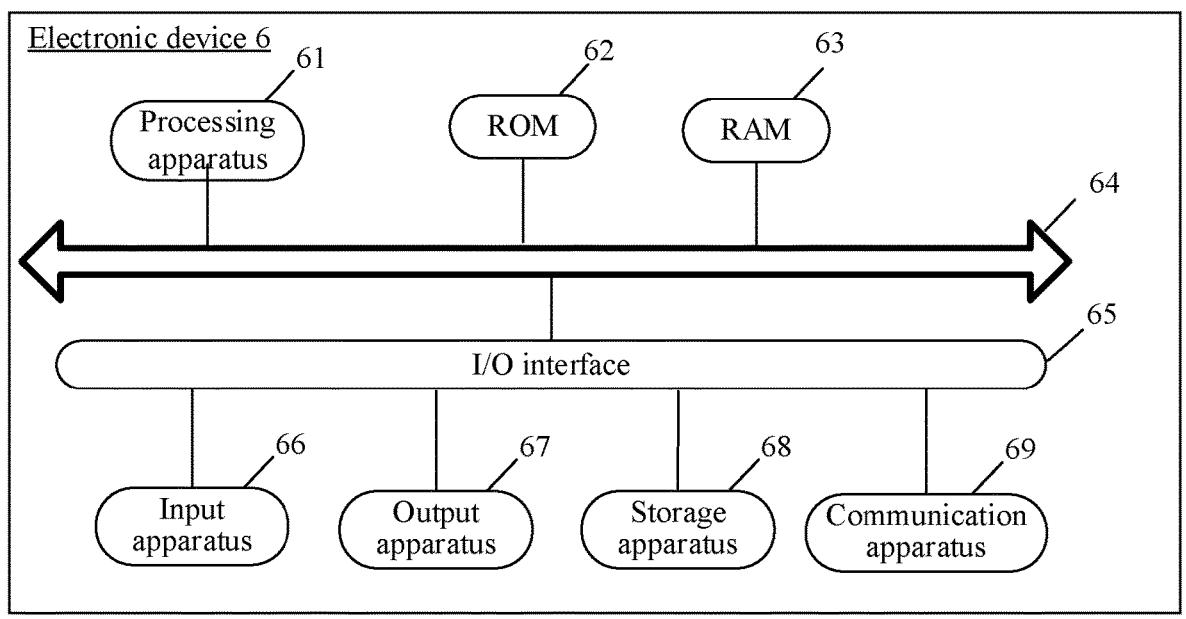
FIG. 18 is a schematic diagram of an electronic device provided by another embodiment of the present disclosure.

Please refer to FIG. 18, which shows a schematic structural diagram of an electronic device 6 suitable for implementing the embodiments of the present disclosure. The electronic device 6 may be a terminal device or a server. The terminal device may include, but is not limited to, a mobile terminal such as a mobile phone, a notebook computer, a digital broadcast receiver, a personal digital assistant (PDA), a portable android device (PAD), a portable media player (PMP), a vehicle-mounted terminal (for example, a vehicle-mounted navigation terminal), etc., and a fixed terminal such as a digital television (TV), a desktop computer, etc. The electronic device 6 shown in FIG. 18 is only an example, and should not bring any limitation to the functions and application scope of the embodiments of the present disclosure.

As shown in FIG. 18, the electronic device 6 may include a processing apparatus (such as a central processor, a graphics processor, etc.) 61, which can perform various appropriate actions and processing according to a program stored in a read only memory (ROM) 62 or a program loaded from a storage apparatus 68 into a random access memory (RAM) 63. In the RAM 63, various programs and data required for operation of the electronic device 6 are also stored. The processing apparatus 61, the ROM 62 and the RAM 63 are connected to each other through a bus 64. An input/output (I/O) interface 65 is also connected to the bus 64.

Generally, the following apparatuses can be connected to the I/O interface 65: an input apparatus 66 including, for example, a touch screen, a touch panel, a keyboard, a mouse, a camera, a microphone, an accelerometer, a gyroscope, etc.; an output apparatus 67 including, for example, a liquid crystal display (LCD), a speaker, a vibrator, etc.; the storage apparatus 68 including, for example, a magnetic tape, a hard disk, etc.; and a communication apparatus 69. The communication apparatus 69 can allow the electronic device 6 to perform wireless or wired communication with other devices to exchange data. Although FIG. 18 shows the electronic device 6 having various apparatuses, it should be understood that it is not required to implement or have all of the illustrated apparatuses. More or fewer apparatuses may alternatively be implemented or provided.

In particular, according to an embodiment of the present disclosure, a process described above with reference to a flowchart can be implemented as a computer software program. For example, an embodiment of the present disclosure includes a computer program product, which includes a computer program carried on a computer-readable medium, and the computer program contains a program code for executing the method shown in the flowchart. In such an embodiment, the computer program may be downloaded and installed from a network through the communication apparatus 69, or installed from the storage apparatus 68, or installed from the ROM 62. When the computer program is executed by the processing apparatus 61, the above functions defined in the methods of the embodiments of the present disclosure are executed.

It should be noted that the above computer-readable medium in the present disclosure may be a computer-readable signal medium or a computer-readable storage medium, or any combination of the two. The computer-readable storage medium may be, for example, but not limited to, an electrical, a magnetic, an optical, an electro-magnetic, an infrared or a semiconductor system, apparatus or device, or a combination of any of the above. More specific examples of the computer-readable storage medium may include, but are not limited to: an electrical connection with one or more wires, a portable computer disk, a hard disk, a random access memory (RAM), a read only memory (ROM), an erasable programmable read-only memory (EPROM or a flash memory), an optical fiber, a portable compact disk-read only memory (CD-ROM), an optical storage device, a magnetic storage device, or any suitable combination of the above. In the present disclosure, the computer-readable storage medium may be any tangible medium that contains or stores a program, and the program may be used by or in combination with an instruction execution system, apparatus or device. In the present disclosure, the computer-readable signal medium may include a data signal propagated in a baseband or as a part of a carrier wave, and a computer-readable program code is carried therein. Such a propagated data signal can take many forms, including but not limited to an electromagnetic signal, an optical signal, or any suitable combination of the above. The computer-readable signal medium may also be any computer-readable medium other than the computer-readable storage medium. The computer-readable signal medium can send, propagate, or transmit the program for use by or in combination with the instruction execution system, apparatus, or device. The program code contained on the computer-readable medium can be transmitted using any suitable medium, including but not limited to: an electric wire, an optical cable, a radio frequency (RF) or the like, or any suitable combination of the above.

The above computer-readable medium may be included in the above electronic device; or may exist alone without being assembled into the electronic device.

The above computer-readable medium carries one or more programs, and when the above one or more programs are executed by the electronic device, the electronic device is caused to execute the methods shown in the above embodiments.

The computer program code used to perform the operations of the present disclosure may be written in one or more programming languages or a combination thereof. The above programming languages include object-oriented programming languages such as Java, Smalltalk, C++, and also conventional procedural programming languages such as "C" language or similar programming languages. The program code can be executed entirely on a user computer, executed partly on the user computer, executed as an independent software package, executed partly on the user computer and partly on a remote computer, or executed entirely on the remote computer or server. In the case involving the remote computer, the remote computer can be connected to the user computer through any kind of networks, including a local area network (LAN) or a wide area network (WAN), or can be connected to an outside computer (for example, being connected via the Internet using an Internet service provider).

The flowcharts and block diagrams in the accompanying drawings illustrate possible implementation architectures, functions and operations of the systems, methods and computer program products according to various embodiments of the present disclosure. In this regard, each block in the flowcharts or block diagrams may represent a module, a program segment, or a part of code, and the module, the program segment, or the part of code contains one or more executable instructions for implementing the specified logic function. It should also be noted that, in some alternative implementations, the functions marked in the blocks may also occur in a different order from the order marked in the drawings. For example, two blocks shown in succession may actually be executed substantially in parallel, and they may sometimes be executed in the reverse order, depending on the functions involved. It should also be noted that each block in the block diagrams and/or flowcharts, and the combination of the blocks in the block diagrams and/or flowcharts, can be implemented by a dedicated hardware-based system that performs the specified functions or operations, or can be implemented by a combination of dedicated hardware and computer instructions.

The units involved in the embodiments described in the present disclosure can be implemented in software or hardware. The name of the unit does not constitute a limitation on the unit itself under certain circumstances. For example, the first acquiring unit can also be described as "a unit for acquiring at least two internet protocol addresses".

The functions described above may be performed at least in part by one or more hardware logic components. For example, without limitation, exemplary types of hardware logic components that can be used include: a field programmable gate array (FPGA), an application specific integrated circuit (ASIC), an application specific standard part (ASSP), a system-on-chip (SOC), a complex programmable logic device (CPLD), etc.

In the context of the present disclosure, a machine-readable medium may be a tangible medium, which may contain or store a program for use by or in combination with the instruction execution system, apparatus or device. The machine-readable medium may be a machine-readable signal medium or a machine-readable storage medium. The machine-readable medium may include, but is not limited to, an electronic, a magnetic, an optical, an electromagnetic, an infrared or a semiconductor system, apparatus or device, or any suitable combination of the above. More specific examples of the machine-readable storage medium would include an electrical connection based on one or more wires, a portable computer disk, a hard disk, a random access memory (RAM), a read only memory (ROM), an erasable programmable read only memory (EPROM or a flash memory), an optical fiber, a compact disk-read only memory (CD-ROM), an optical storage device, a magnetic storage device, or any suitable combination of the above.

In a first aspect, according to one or more embodiments of the present disclosure, there is provided a video recording method, including:
　acquiring speed varying information of a speed-varied video, where the speed varying information is used to represent a playing speed change of the speed-varied video; performing reverse speed-varying processing on the speed-varied video according to the speed varying information to obtain an original speed video; displaying the original speed video, and synchronously performing video shooting to generate an original speed target video; performing speed varying processing on the original speed target video according to the speed varying information to obtain a target speed-varied video.

According to one or more embodiments of the present disclosure, performing the reverse speed-varying processing on the speed-varied video according to the speed varying information to obtain the original speed video includes: determining a playing timestamp of the speed-varied video according to the speed varying information, where the playing timestamp is a timestamp for playing the speed-varied video at an original speed; determining a video frame corresponding to the playing timestamp of the speed-varied video; and generating the original speed video according to the video frame.

According to one or more embodiments of the present disclosure, the speed varying information includes a speed varying anchor point of the speed-varied video and a playing speed corresponding to the speed varying anchor point; and determining the playing timestamp of the speed-varied video according to the speed varying information includes: determining a first time interval according to the speed varying anchor point of the speed-varied video; determining a time step length corresponding to the speed varying anchor point according to an integral of the playing speed corresponding to the speed varying anchor point of the speed-varied video over the first time interval; and determining the playing timestamp of the speed-varied video according to the time step length.

According to one or more embodiments of the present disclosure, determining the video frame corresponding to the playing timestamp of the speed-varied video includes: decoding the speed-varied video according to the playing timestamp to obtain the video frame corresponding to the playing timestamp; and generating the original speed video according to the video frame includes: acquiring a preset recording timestamp, where the recording timestamp is used to represent a playing timestamp of the original speed video; and determining a recording video frame corresponding to the recording timestamp according to a corresponding relationship between the recording timestamp and the playing timestamp, and synthesizing the original speed video from the recording video frame.

According to one or more embodiments of the present disclosure, the speed-varied video includes audio data, and the method further includes: determining a playing speed, of the audio data, corresponding to the playing timestamp; and resampling the audio data according to the playing speed to obtain an audio frame corresponding to the playing timestamp; and generating the original speed video according to the video frame includes: generating the original speed video according to the video frame and a corresponding audio frame.

According to one or more embodiments of the present disclosure, resampling the audio data according to the playing speed to obtain the audio frame corresponding to the playing timestamp includes: acquiring a preset first audio sampling rate; determining a second audio sampling rate according to the first audio sampling rate and the playing speed of the audio data; and resampling the audio data according to the second audio sampling rate to obtain the audio frame corresponding to the playing timestamp.

According to one or more embodiments of the present disclosure, the method further includes: performing audio-video synchronization on the video frame and the audio frame.

In a second aspect, according to one or more embodiments of the present disclosure, there is provided a video recording device, including:
　an acquiring unit, configured to acquire speed varying information of a speed-varied video, where the speed varying information is used to represent a playing speed change of the speed-varied video;
　a reverse speed-varying unit, configured to perform reverse speed-varying processing on the speed-varied video according to the speed varying information to obtain an original speed video;

a generating unit, configured to display the original speed video, and synchronously perform video shooting to generate an original speed target video; and a speed varying unit, configured to perform speed varying processing on the original speed target video according to the speed varying information to obtain a target speed-varied video.

In a possible implementation, the reverse speed-varying unit is specifically configured to: determine a playing timestamp of the speed-varied video according to the speed varying information, where the playing timestamp is a timestamp for playing the speed-varied video at an original speed; determine a video frame corresponding to the playing timestamp of the speed-varied video; and generate the original speed video according to the video frame.

In a possible implementation, the speed varying information includes a speed varying anchor point of the speed-varied video and a playing speed corresponding to the speed varying anchor point; when determining the playing timestamp of the speed-varied video according to the speed varying information, the reverse speed-varying unit is specifically configured to: determine a first time interval according to the speed varying anchor point of the speed-varied video; determine a time step length corresponding to the speed varying anchor point according to an integral of the playing speed corresponding to the speed varying anchor point of the speed-varied video over the first time interval; and determine the playing timestamp of the speed-varied video according to the time step length.

In a possible implementation, when determining the video frame corresponding to the playing timestamp of the speed-varied video, the reverse speed-varying unit is specifically configured to: decode the speed-varied video according to the playing timestamp to obtain the video frame corresponding to the playing timestamp; and the speed varying unit is specifically configured to: acquire a preset recording timestamp, where the recording timestamp is used to represent a playing timestamp of the original speed video; and determine a recording video frame corresponding to the recording timestamp according to a corresponding relationship between the recording timestamp and the playing timestamp, and synthesize the original speed video from the recording video frame.

In a possible implementation, the speed-varied video includes audio data, and the reverse speed-varying unit is further configured to: determine a playing speed, of the audio data, corresponding to the playing timestamp; and resample the audio data according to the playing speed to obtain an audio frame corresponding to the playing timestamp. The speed varying unit is specifically configured to: generate the original speed video according to the video frame and a corresponding audio frame.

In a possible implementation, when resampling the audio data according to the playing speed to obtain the audio frame corresponding to the playing timestamp, the reverse speed-varying unit is specifically configured to: acquire a preset first audio sampling rate; determine a second audio sampling rate according to the first audio sampling rate and the playing speed of the audio data; and resample the audio data according to the second audio sampling rate to obtain the audio frame corresponding to the playing timestamp.

In a possible implementation, the speed varying unit is further configured to: perform audio-video synchronization on the video frame and the audio frame.

In a possible implementation, the generating unit includes:
a displaying module, configured to display the original speed video on a first interaction interface; and
a recording module, configured to synchronously perform video shooting to generate the original speed target video, when the original speed video is displayed on the first interaction interface.

In a possible implementation, the original speed video includes original speed video data and/or original speed audio data, and the displaying module is specifically configured to: play the original speed video data and/or the original speed audio data on the first interaction interface.

In a third aspect, an embodiment of the present disclosure provides an electronic device, including at least one processor and a memory;
the memory stores computer-executed instructions; and
the at least one processor executes the computer-executed instructions stored in the memory to cause the at least one processor to execute the video recording method according to the first aspect and various possible designs of the first aspect.

In a fourth aspect, an embodiment of the present disclosure provides a computer-readable storage medium, where the computer-readable storage medium stores computer-executed instructions, and when the computer-executed instructions are executed by a processor, the video recording method according to the first aspect and various possible designs of the first aspect is implemented.

In a fifth aspect, an embodiment of the present disclosure provides a computer program product, the computer program product includes a computer program, the computer program is stored in a readable storage medium, and at least one processor of an electronic device can read the computer program from the readable storage medium, and the at least one processor executes the computer program to cause the electronic device execute the video recording method according to the first aspect and various possible designs of the first aspect.

In a sixth aspect, an embodiment of the present disclosure provides a computer program, the computer program is stored in a readable storage medium, and at least one processor of an electronic device can read the computer program from the readable storage medium, and the at least one processor executes the computer program to cause the electronic device execute the video recording method according to the first aspect and various possible designs of the first aspect.

The above descriptions are only preferred embodiments of the present disclosure and an explanation of the applied technical principles. Those skilled in the art should understand that the disclosure scope involved in this disclosure is not limited to the technical solutions formed by specific combinations of the above technical features, and should also cover other technical solutions formed by any arbitrary combination of the above technical features or their equivalents without departing from the above disclosure concept, for example, a technical solution formed by a mutual replacement between the above features and the technical features having similar functions (but not limited to) disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure.

Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or methodological actions, it should be understood that the subject matter defined in the appended claims is not necessarily limited to the specific features or actions described above. On the contrary, the specific features and actions described above are merely illustrative forms of implementing the claims.

The invention claimed is:

1. A video recording method, comprising:
performing reverse speed-varying processing on a speed-varied video to obtain an original speed video;
displaying the original speed video, and synchronously performing video shooting to generate an original speed target video; and
performing speed varying processing on the original speed target video to obtain a target speed-varied video, wherein a playing speed change of the target speed-varied video is consistent with a playing speed change of the speed-varied video.

2. The method according to claim 1, wherein performing the reverse speed-varying processing on the speed-varied video to obtain the original speed video comprises:
acquiring speed varying information of the speed-varied video, wherein the speed varying information is used to represent a playing speed change of the speed-varied video;
performing the reverse speed-varying processing on the speed-varied video according to the speed varying information to obtain the original speed video;
wherein performing the speed varying processing on the original speed target video to obtain the target speed-varied video comprises:
performing the speed varying processing on the original speed target video according to the speed varying information to obtain the target speed-varied video.

3. The method according to claim 2, wherein performing the reverse speed-varying processing on the speed-varied video according to the speed varying information to obtain the original speed video comprises:
determining a playing timestamp of the speed-varied video according to the speed varying information, wherein the playing timestamp is a timestamp for playing the speed-varied video at an original speed;
determining a video frame corresponding to the playing timestamp of the speed-varied video; and
generating the original speed video according to the video frame.

4. The method according to claim 3, wherein the speed varying information comprises a speed varying anchor point of the speed-varied video and a playing speed corresponding to the speed varying anchor point; and determining the playing timestamp of the speed-varied video according to the speed varying information comprises:
determining a first time interval according to the speed varying anchor point of the speed-varied video;
determining a time step length corresponding to the speed varying anchor point according to an integral of the playing speed corresponding to the speed varying anchor point of the speed-varied video over the first time interval; and
determining the playing timestamp of the speed-varied video according to the time step length.

5. The method according to claim 3, wherein determining the video frame corresponding to the playing timestamp of the speed-varied video comprises:
decoding the speed-varied video according to the playing timestamp to obtain the video frame corresponding to the playing timestamp;
and generating the original speed video according to the video frame comprises:
acquiring a preset recording timestamp, wherein the recording timestamp is used to represent a playing timestamp of the original speed video; and
determining a recording video frame corresponding to the recording timestamp according to a corresponding relationship between the recording timestamp and the playing timestamp, and synthesizing the original speed video from the recording video frame.

6. The method according to claim 3, wherein the speed-varied video comprises audio data, and the method further comprises:
determining a playing speed, of the audio data, corresponding to the playing timestamp; and
resampling the audio data according to the playing speed to obtain an audio frame corresponding to the playing timestamp;
and generating the original speed video according to the video frame comprises:
generating the original speed video according to the video frame and a corresponding audio frame.

7. The method according to claim 6, wherein resampling the audio data according to the playing speed to obtain the audio frame corresponding to the playing timestamp comprises:
acquiring a preset first audio sampling rate;
determining a second audio sampling rate according to the first audio sampling rate and the playing speed of the audio data; and
resampling the audio data according to the second audio sampling rate to obtain the audio frame corresponding to the playing timestamp.

8. The method according to claim 6, wherein the method further comprises:
performing audio-video synchronization on the video frame and the audio frame.

9. An electronic device, comprising: at least one processor and a memory;
wherein the memory stores computer-executed instructions; and
the at least one processor executes the computer-executed instructions stored in the memory to cause the at least one processor to:
perform reverse speed-varying processing on a speed-varied video to obtain an original speed video;
display the original speed video, and synchronously preform video shooting to generate an original speed target video; and
perform speed varying processing on the original speed target video to obtain a target speed-varied video, wherein a playing speed change of the target speed-varied video is consistent with a playing speed change of the speed-varied video.

10. The electronic device according to claim 9, wherein the at least one processor is caused to:

acquire speed varying information of the speed-varied video, wherein the speed varying information is used to represent a playing speed change of the speed-varied video;

wherein the at least one processor is further caused to:

perform the reverse speed-varying processing on the speed-varied video according to the speed varying information to obtain the original speed video;

perform the speed varying processing on the original speed target video according to the speed varying information to obtain the target speed-varied video.

11. The electronic device according to claim 10, wherein the at least one processor is caused to:

determine a playing timestamp of the speed-varied video according to the speed varying information, wherein the playing timestamp is a timestamp for playing the speed-varied video at an original speed;

determine a video frame corresponding to the playing timestamp of the speed-varied video; and generate the original speed video according to the video frame.

12. The electronic device according to claim 11, wherein the speed varying information comprises a speed varying anchor point of the speed-varied video and a playing speed corresponding to the speed varying anchor point; and the at least one processor is caused to:

determine a first time interval according to the speed varying anchor point of the speed-varied video;

determine a time step length corresponding to the speed varying anchor point according to an integral of the playing speed corresponding to the speed varying anchor point of the speed-varied video over the first time interval; and determine the playing timestamp of the speed-varied video according to the time step length.

13. The electronic device according to claim 11, wherein the at least one processor is caused to:

decode the speed-varied video according to the playing timestamp to obtain the video frame corresponding to the playing timestamp;

and the at least one processor is further caused to:

acquire a preset recording timestamp, wherein the recording timestamp is used to represent a playing timestamp of the original speed video; and determine a recording video frame corresponding to the recording timestamp according to a corresponding relationship between the recording timestamp and the playing timestamp, and synthesize the original speed video from the recording video frame.

14. The electronic device according to claim 11, wherein the speed-varied video comprises audio data, and the at least one processor is further caused to:

determine a playing speed, of the audio data, corresponding to the playing timestamp; and resample the audio data according to the playing speed to obtain an audio frame corresponding to the playing timestamp;

and the at least one processor is further caused to:

generate the original speed video according to the video frame and a corresponding audio frame.

15. The electronic device according to claim 14, wherein the at least one processor is further caused to:

acquire a preset first audio sampling rate;

determine a second audio sampling rate according to the first audio sampling rate and the playing speed of the audio data; and resample the audio data according to the second audio sampling rate to obtain the audio frame corresponding to the playing timestamp.

16. The method according to claim 14, wherein the at least one processor is further caused to:

perform audio-video synchronization on the video frame and the audio frame.

17. A non-transitory computer-readable storage medium, wherein the computer-readable storage medium stores computer-executed instructions, and when a processor executes the computer-executed instructions, the following operations are implemented:

performing reverse speed-varying processing on a speed-varied video to obtain an original speed video;

displaying the original speed video, and synchronously performing video shooting to generate an original speed target video; and performing speed varying processing on the original speed target video to obtain a target speed-varied video, wherein a playing speed change of the target speed-varied video is consistent with a playing speed change of the speed-varied video.

18. The storage medium according to claim 17, wherein before performing reverse speed-varying processing on the speed-varied video to obtain the original speed video, the following operation is implemented:

acquiring speed varying information of the speed-varied video, wherein the speed varying information is used to represent a playing speed change of the speed-varied video;

wherein performing the reverse speed-varying processing on the speed-varied video to obtain the original speed video comprises:

performing the reverse speed-varying processing on the speed-varied video according to the speed varying information to obtain the original speed video;

wherein performing the speed varying processing on the original speed target video to obtain the target speed-varied video comprises:

performing the speed varying processing on the original speed target video according to the speed varying information to obtain the target speed-varied video.

19. The storage medium according to claim 18, wherein performing the reverse speed-varying processing on the speed-varied video to obtain the original speed video comprises:

determining a playing timestamp of the speed-varied video according to the speed varying information, wherein the playing timestamp is a timestamp for playing the speed-varied video at an original speed;

determining a video frame corresponding to the playing timestamp of the speed-varied video; and generating the original speed video according to the video frame.

20. The storage medium according to claim 19, wherein the speed varying information comprises a speed varying anchor point of the speed-varied video and a playing speed corresponding to the speed varying anchor point; and determining the playing timestamp of the speed-varied video according to the speed varying information comprises:

determining a first time interval according to the speed varying anchor point of the speed-varied video;

determining a time step length corresponding to the speed varying anchor point according to an integral of the playing speed corresponding to the speed varying anchor point of the speed-varied video over the first time interval; and
determining the playing timestamp of the speed-varied video according to the time step length.

* * * * *